3,528,999
SUBSTITUTED METHYLENE STEROIDS
AND THEIR PREPARATION
Peter Bladon, Lenzie, Glasgow, Scotland, assignor to Organon Inc., West Orange, N.J., a corporation of New Jersey
No Drawing. Filed July 24, 1968, Ser. No. 747,089
Claims priority, application Great Britain, July 28, 1967, 34,739/67
Int. Cl. C07c *169/32, 169/34*
U.S. Cl. 260—397.3
2 Claims

ABSTRACT OF THE DISCLOSURE

The present invention relates to novel 16,17-(substituted methylene)-20-oxygenated steroids of the pregnane series having valuable biological activities, and to processes for the preparation thereof.

---

This invention relates to novel 16α,17α-methylene steroids, in which the methylene group is substituted, and to a process for their preparation.

More particularly, it relates to novel 16α,17α-(substituted methylene)-steroids of the pregnane series having the partial formula:

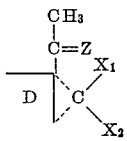

wherein:

$X_1$=hydrogen or a saturated or unsaturated hydrocarbon radical, $X_2$=a saturated or unsaturated hydrocarbon radical when $X_1$ is not hydrogen, and is an unsaturated hydrocarbon radical when $X_1$ is hydrogen, or $X_1+X_2$ form together with the methylene carbon atom a saturated or unsaturated cycloaliphatic radical, Z=O, H(OH) or H(OAcyl).

The present invention particularly comprises the novel compounds having the formula:

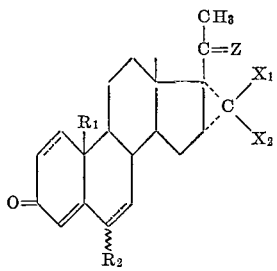

wherein:

$C_1$–$C_2$ and/or $C_6$–$C_7$ may be saturated or unsaturated, $R_1$=a hydrogen atom or a methyl group, $R_2$=a hydrogen atom, a lower alkyl group or a halogen atom, and $X_1$, $X_2$ and Z have the meanings as defined above.

The compounds according to the invention are very valuable on account of their biological activities. They exert strong progestational, ovulation-inhibiting and pregnancy-maintaining properties.

The compounds according to the invention may be administered parenterally or orally in the form of suspensions, solutions, emulsions or solid pharmaceutical dosage unit forms, usually after mixing with auxiliaries or, if desired, with other active components.

16,17-methylene-steroids, in which the methylene group is not substituted, are known. They are obtained as by-products in extremely low yields by subjecting the corresponding 16,17-pyrazolino compounds to thermal treatment, a process which leads principally to 16-methyl-Δ$^{16}$-steroids, or in better yield by treatment with an acid catalyst.

Surprisingly, it has now been found that 16,17-(substituted methylene)-steroids as defined above can be obtained from the substituted pyrazolino-steroids in good yield by thermal treatment or by photolysis with only trace amounts of the Δ$^{16}$-compounds being formed as by-products. More surprisingly treatment with an acid catalyst gives lower yields of the substituted methylene steroids.

The reaction may be illustrated by the following reaction scheme.

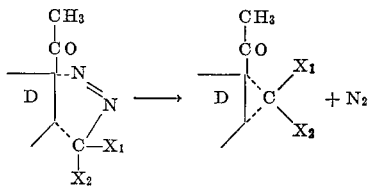

wherein X has the meaning as defined above.

The 16,17-(substituted-pyrazolino)-steroids can be obtained by the reaction of a suitable Δ$^{16}$-20-keto-steroid with the appropriate diazo-compound of the formula $X_1X_2$—C—$N_2$. This reaction is usually carried out in a suitable organic solvent such as an ether or a halogenated hydrocarbon, and at a temperature preferably below 25° C.

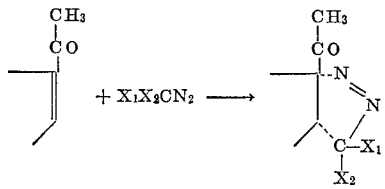

The conversion of the thus obtained 16,17-(substituted-pyrazolino)-20-keto-steroids into the corresponding 16,17-(substituted-methylene)-20-keto-steroids by splitting off nitrogen may be performed by thermal treatment, by photolysis, or less effectively by treatment with an acid catalyst.

The thermal treatment is usually carried out at a temperature between 100° C. and 225° C. either alone at atmospheric or reduced pressure or in an inert solvent such as decalin or toluene until one molecular equivalent of nitrogen has been liberated, usually 15 to 60 minutes.

The photolysis is usually carried out by irradiating a solution of the 16,17-(substituted-pyrazolino)-steroid in a suitable solvent, such as dioxan, by means of a medium or high pressure mercury vapour lamp placed at a suitable distance from the flask. The reaction is preferably carried out in a quartz flask.

The splitting off of nitrogen may also be accomplished by treating the substituted pyrazolino compound with an acid catalyst, such as a Lewis acid like boron trifluoride or its etherate, or an organic or inorganic acid such as perchloric acid, trifluoro acetic acid and the like.

Usually the reaction is performed in such a way that the substituted diazo-methylene compound is added to a solution of the acid catalyst used in a suitable organic solvent, which may be an ether, e.g., dioxane, an aliphatic ketone, such as acetone, or a halogenated hydrocarbon, such as methylene chloride.

A preferred method consists of reacting the substituted diazomethylene compound with a combination of boron trifluoride or its etherate, a solvent and a surface-active catalyst which may be the diazomethylene compound itself.

The acid catalyst treatment is preferably carried out at a temperature between 0° C. and 50° C., usually at about 20° C.; the reaction time varies between 10 minutes and some hours according to the temperature of the reaction.

In the 16,17-(substituted-methylene)-20-keto-steroids obtained according to the method disclosed, other groups or substituents may be introduced by any method known, per se: e.g. acyloxy groups, if present, may be subject to hydrolysis, hydroxyl groups, when present, may be oxidised to keto-groups, e.g., by Oppenauer oxidation. The 20-keto group, or other keto groups if present, may be reduced to a hydroxyl group and may subsequently be esterified with an inorganic acid such as phosphoric acid or sulphuric acid, or with an organic mono- or polycarboxylic acid preferably having 1–18 carbon atoms.

In the presence of a $\Delta^4$-3-keto-group other double bonds may be introduced at $C_6$ and/or $C_1$ by chemical or microbiological means. In the presence of a $5\alpha$-3-keto group double bonds may be introduced simultaneously at $C_1$ and $C_4$.

The $\Delta^1$-double bond may be introduced chemically by treatment of the $\Delta^4$-3-keto-steroid with a suitable quinone or with selenium dioxide. Microbiologically, the $\Delta^1$-double bond may be introduced by incubation with e.g. Bacillus sphaericus or with Corynebacterium simplex.

The $\Delta^6$-double bond may be introduced by treatment with a suitable quinone, particularly a quinone having a redox potential of less than −0.5.

It may also be possible to introduce the $\Delta^1$- and $\Delta^6$-double bonds simultaneously by halogenation followed by dehydrohalogenation.

The invention is illustrated by the following examples.

EXAMPLE I

A solution of ethyl-N-nitroso-N-allyl carbamate (80 g., 0.51 mole) in ether (300 ml.) was treated with 20% methanolic potassium hydroxide (40 ml.) dropwise with cooling. The ethereal solution of diazopropene was washed with water until it was neutral and then added to a solution of pregna-5,16-dien-3β-ol-20-one (20 g.; 0.056 mole) in ether (100 ml.) and methanol (800 ml.). The wine red solution was kept in the dark at room temperature for 16 hours, and then concentrated under reduced pressure when 16α,17α-[3′,1′-(3′-vinyl-1′-pyrazolino)]-pregn-5-en-3β-ol-20-one (9.6 g.) crystallised out.

EXAMPLE II

16α,17α - [3′,1′ - (3′-vinyl-1′-pyrazolino)]-pregn-5-en-3β-ol-20-one (2 g.) was heated to 120–130° C. in a round bottom flask under reduced pressure with constant agitation. After 4 to 5 minutes when the evolution of nitrogen was complete, the product was cooled under reduced pressure and the glass-like product triturated with methanol. A crystalline solid (1.8 g.) was obtained which showed mainly one spot on thin layer chromatography. Recrystallisation from methanol gave 16α,17α-(1′-vinylmethylene)-pregn-5-ene-3β-ol-20-one (1.5 g.).

The acetate (500 mg.) was hydrolysed in 2% methanolic potassium hydroxide solution and the crude product was crystallised from methanol to give 16α,17α-(1′-vinylmethylene)-pregn-5-ene-3β-ol-20-one (350 mg.).

EXAMPLE III

A solution of 16α,17α-[3′,1′-(3′-vinyl-1′-pyrazolino)]-pregn-5-en-3β-ol-20-one acetate (2.5 g.) in acetone (125 cc.) was treated with boron trifluoride etherate (5 cc.) and the mixture stirred vigorously at room temperature in the presence of glass beads for 1 hour. It was then poured into water and the product isolated by extraction with chloroform. Purification of the crude residue from the evaporated extract on a short column of alumina followed by crystallisation from methanol gave 16α,17α - (1′ - vinylmethylene) - pregn-5-en-3β-ol-20-one acetate (1.05 g.).

EXAMPLE IV

A solution of 16α,17α-[3′,1′-(3′-vinyl-1′-pyrazolino)]-pregn-5-en-3β-ol-20-one acetate (1 g.) in peroxide free dioxan was irradiated in a quartz flask with a medium pressure mercury vapour lamp for 1 hour during which time the flask was shaken occasionally to assist the evolution of nitrogen. The solution was evaporated to dryness; the residue was dissolved in benzene, run through a short column of alumina, and the eluate and washings were evaporated to dryness. The product crystallised from methanol to give 16α,17α-(1′-vinylmethylene)-pregn-5-en-3β-ol-20-one acetate (575 mg.).

This reaction can be carried out equally well using a high pressure mercury vapour lamp.

EXAMPLE V

A solution of 16α,17α-(1′-vinylmethylene)-pregn-5-ene-3β-ol-20-one (3 g.) in toluene (120 cc.) and freshly distilled cyclohexanone (15 ml.) was slowly distilled to remove all traces of water and then treated with a solution of aluminium isopropoxide (1.5 g.) in toluene and the mixture heated under reflux for 45 minutes. The cooled solution was treated with a 10% solution of Rochelle salt and volatile material removed by steam distillation for 5 hours. The product was extracted with chloroform and the washed and dried extract was evaporated to give a yellowish solid which was purified by column chromatography on alumina (100 g.). The fraction eluted with a mixture of benzene/60–80 petrol 2:1 was crystallised from methanol to give 16α,17α-(1′-vinylmethylene)-progesterone (1.78 g.).

EXAMPLE VI

An ethereal solution of diazopropene prepared according to Example I (0.51 mole) was added to a solution of pregna-4,16-diene-3,20-dione (20 g.) in ether (100 ml.) and methanol (800 ml.). The red solution was kept in the dark at room temperature for 16 hours and the 16α,17α-[3′,1′ - [3′ - vinyl-1′-pyrazolino)]-pregn-4-ene-3,20-dione isolated by removal of the solvent under reduced pressure when the 16α,17α - [3′,1′ - (3′ - vinyl - 1′ - pyrazolino)]-(8.5 g.) crystallised out.

EXAMPLE VII

16α,17α - [3′,1′ - (3′-vinyl-1′-pyrazolino)]-progesterone (5 g.) was heated to 150° C. under reduced pressure for 10 minutes with frequent agitation, when evolution of nitrogen was complete. After cooling the residue was dissolved in a little ether and methanol added; after removal of the ether 16α,17α-(1′-vinylmethylene)-progesterone (3.6 g.) crystallised out.

EXAMPLE VIII

An ethereal solution of diazopropene (0.25 mole) prepared according to Example I was added to a solution of 6-methyl-pregna-5,16-dien-3β-ol-20-one (10 g.) in ether (75 ml.) and methanol (600 ml.). The dark red solution was kept at room temperature for 18 hours in the dark and the 16α,17α-[3′,1′-(3-vinyl-1′-pyrazolino)]-6-methyl-pregn-5-en-3β-ol-20-one isolated by concentration under reduced pressure and allowing the product (4.6 g.) to crystallise.

EXAMPLE IX

In a manner as described under Example II 16α,17α-[3′,1′ - (3′-vinyl-1′-pyrazolino)]-6-methyl-pregn-5-en-3β-ol-20-one (40 g.) was converted to 16α,17α-(1′-vinylmethylene)-6-methyl-pregn-5-en-3β-ol-20-one (2.8 g.).

EXAMPLE X

An ethereal solution of diazopropene (0.25 mole) prepared according to Example I was quickly added to a solution of 6α-methyl-pregn-4,16-diene-3,20-dione (9.0 g.)

in ether (50 ml.) and methanol (400 ml.) and the red solution allowed to stand in the dark at room temperature for 18 hours. After removal of the ether and most of the methanol by distillation under reduced pressure, the concentrated solution was set aside at 0° C. for 24 hours when the product, 16α,17α-[3',1'-vinyl-1'-pyrazolino)] - 6α - methyl - pregn - 4 - ene-3,20-dione (3.9 g.) crystallised.

EXAMPLE XI

16α,17α-(1'-vinylmethylene)-6 - methyl-pregn-5-en-3β-ol-20-one (2.5 g.) was oxidised according to the method in Example V. The crude product was extracted into chloroform and purified by column chromatography on alumina (100 g.). The fraction eluted with benzene/petrol (40/60) 2:1 after crystallisation from methanol gave 16α,17α-(1'-vinylmethylene)-6α-methyl-progesterone.

EXAMPLE XII

16α,17α-[3',1'-(3'-vinyl - 1' - pyrazolino)]-6α-methyl-pregn-4-ene-3,20-dione (2.0 g.) prepared according to Example X was heated at 180° under reduced pressure with agitation until gassing ceased. On cooling the glassy product was dissolved in ether, diluted with methanol and the ether then removed under reduced pressure. 16α,17α-(1'-vinylmethylene)-6α-methyl progesterone, identical to that obtained in Example XI crystallised out.

EXAMPLE XIII

A solution of ethyl-N-nitroso-N-proparglycarbamate (10 g.) in ether (50 ml.) was treated with 20% methanolic potassium hydroxide (5 ml.) dropwise with cooling. The ethereal solution of diazopropyne was washed with water until it was neutral and then added to a solution of pregna-5,16-diene-3β-ol-20-one (2.5 g.) in ether (30 ml.) and methanol (100 ml.). After standing 24 hours the solution was carefully concentrated under reduced pressure until crystallisation commenced. After standing at 0° C. for 24 hours the product was collected and recrystallised from methanol to give 16α,17α-[3',1'-(3'-ethynyl-1'-pyrazolino)]-pregn - 5 - en - 3β - ol-20-one (1.7 g.).

EXAMPLE XIV

16α,17α-[3',1'-(3'-ethynyl - 1' - pyrazolino)]-pregn-5-en-3β-ol-20-one acetate (1.5 g.) was heated to 150° C. under reduced pressure for 10 minutes, cooled and the product crystallised from methanol to yield 16α,17α-(1'-ethynylmethylene)-pregn-5-en-3β-ol-20-one acetate (1.0 g.). Hydrolysis with 2% methanolic potassium hydroxide gave 16α,17α-(1'-ethynylmethylene)-pregn-5-en - 3β - ol-20-one after crystallisation from methanol.

EXAMPLE XV

16α,17α-(1'-ethynylmethylene)-pregn - 5 - en-3β-ol-20-one (1.5 g.) was oxidised to the 3-ketone as described for the 16α,17α-vinylmethylene compound in Example V. After chromatography on alumina in benzene/petrol (60/80) 2:1 and recrystallisation from methanol 16α,17α-(1'-ethynylmethylene)-progesterone (0.8 g.) was obtained.

EXAMPLE XVI

In a manner described in Example XIII 6-methyl-pregn-5,16-dien-3β-ol-20-one was reacted with diazopropyne using the same concentration and proportions. The resulting 16α,17α-[3',1'-(3'-ethynyl - 1' - pyrazolino)]-6-methyl-pregn-5-en-3β-ol-20-one separated from the concentrated methanol solution—yield 45%.

EXAMPLE XVII

16α,17α-[3',1'-(3'-ethynyl - 1' - pyrazolino)]-6-methyl-pregn-5-en-3β-ol-20-one (500 mg.) in freshly distilled dioxan (100 ml.) was irradiated in a quartz flask for 40 minutes using a medium pressure mercury vapour lamp 5 cm. from the flask, after which time gassing had ceased. The solution was evaporated under reduced pressure and the residue crystallised from methanol to give 16α,17α-(1'-ethynylmethylene)-6-methyl-pregn - 5 - en - 3β-ol-20-one (325 mg.).

EXAMPLE XVIII

16α,17α-(1'-ethynylmethylene) - 6 - methyl-pregn-5-en-3β-ol-20-one (1.2 g.) was oxidised to the 3-ketone as described in Example V. The crude product was purified by column chromatography on alumina and the fraction obtained by elution with benzene/petrol (60/80 2:1 recrystallised from methanol to give 16α,17α-(1'-ethynylmethylene)-6α-methylprogesterone.

EXAMPLE XIX

To a solution of 6α-chloro-Δ$^{16}$-dehydro-progesterone 5 g.) in ether (40 ml.) and methanol (300 ml.) was added a solution of diazopropene (0.2 mole) prepared according to Example I. After 16 hours the reaction mixture was worked up as described and the resulting 16α,17α-[3',1'-(3'-vinyl - 1' - pyrazolino)]-6α-chloro-progesterone (2.1 g.) isolated by crystallisation from methanol.

EXAMPLE XX

16α,17α-[3',1'-(3' - vinyl - 1' - pyrazolino)]-6α-chloro-progesterone (1.0 g.) in dioxan (200 ml.) was irradiated in a quartz flask for 40 minutes using a medium pressure mercury vapour lamp at a distance of 6 cm. from the flask. The solution was then evaporated to dryness under reduced pressure and the residue extracted with benzene, diluted with an equal volume of petrol (60/80) and poured on to a column of alumina (50 g.). The product was eluted with benzene/petrol (60/80) 1:1 and after removal of the solvent the 16α,17α-(1'-vinylmethylene)-6α-chloro-progesterone crystallised from methanol.

EXAMPLE XXI

In a manner similar to Example XIX 6α-chloro-Δ$^{16}$-dehydro-progesterone was reacted with diazopropene and the 16α,17α - [3',1' - (3' - ethynyl - 1' - pyrazolino)]-6α-chloro progesterone isolated and crystallised from methanol. Irradiation of a 0.5% solution in freshly distilled dioxan as described in Example XX provided 16α,17α-(1'-ethynylmethylene)-6α-chloro-progesterone.

EXAMPLE XXII

A solution of 1.25 g. of 16α,17α-(1'-vinylmethylene)-progesterone and 1.25 g. of chloranil in 20 ml. of t-butyl alcohol was refluxed for one hour and then concentrated under vacuum to a small volume. The resulting residue was taken up in methylene chloride and, after filtering through 10 g. of supercel, washed with dilute sodium hydroxide and with water until neutral. The solvent was removed in vacuo and the residue chromatographed on supercel to obtain 16α,17α-(1'-vinylmethylene)-Δ$^{4,6}$-pregnadiene-3,20-dione.

In an analogous manner 16α,17α-(1'-vinylmethylene)-6α-chloro - progesterone, 16α,17α-(1'-vinylmethylene)-6α-methylprogesterone, 16α,17α - (1'-ethynylmethylene)-progesterone, 16α,17α-(1' - ethynylmethylene) - 6α - chloro-progesterone and 16α,17α-(1'-ethylmethylene)-6α-methylprogesterone were converted to the corresponding Δ$^6$-dehydro derivatives.

EXAMPLE XXIII

A mixture of 1 g. of 16α,17α-(1'-vinylmethylene)-progesterone and 1 g. of 2,3-dicyano-5,6-dichloro-benzoquinone (D.D.Q.) in 20 ml. of dioxan were refluxed for 16 hours. After cooling, the precipitate was filtered and methylene chloride was added to the filtrate. The solution was washed with water, with sodium bicarbonate solution and finally with water until neutral. After drying over anhydrous sodium sulphate the methylene chloride was evaporated in vacuo. The residue was chromatographed on supercel after which 16α,17α-(1'-vinylmethylene)-Δ$^{1,4}$-pregnadiene-3,20-dione was obtained.

In an analogous manner 16α,17α-(1'-vinylmethylene)-Δ⁴,⁶-pregnadiene - 3,20 - dione, 16α,17α - (1' - ethynylmethylene) - Δ⁴,⁶-pregnadiene - 3,20 - dione, 16α,17α-(1'-vinylmethylene) - 6 - methyl - Δ⁴,⁶-pregnadiene - 3,20-dione and 16α,17α - 1' - ethynylmethylene) - 6 - methyl-Δ⁴,⁶-pregnadiene-3,20-dione were converted to the corresponding Δ¹-dehydro derivatives.

EXAMPLE XXIV

A solution of pregna-5,16-dien-3β-ol-20-one acetate (2 g.) in methanol (20 ml.) and ether (20 ml.) was treated with a neutral ethereal solution of phenyl diazomethane prepared from N-nitroso-N-phenyl urea (2 g.) and the mixture was left to stand for 24 hours in the dark at room temperature. The ether was then removed by evaporation and the methanolic solution left to crystallise giving 16α,17α - [3',1'-(3'-phenyl-1'-pyrazolino)] - pregn - 5 - en-3β-ol-20-one acetate (1.45 g.) M.P. 153° (decomp.).

EXAMPLE XXV

16α,17α - [3',1' - (3'-phenyl-1'-pyrazolino)] - pregn - 5-en-ol-20-one acetate (100 mg.) was heated under vacuum until it decomposed and evolution of nitrogen had ceased. The resulting oil was crystallised from ethyl acetate to give 16α,17α-1'-phenyl-methylene) - pregn 5 - ene - 3β - ol-20-one acetate (70 mg.).

In the manner as described in Example V the above compound after alkaline hydrolysis was converted into 16α,17α-(1'-phenylmethylene)-progesterone.

In a manner analogous to Example XXIV, XXV and V 6-methyl-pregna-5,16-dien-3β-ol-20-one acetate and 6-chloro-pregna-5,16-dien-3β-ol-20-one acetate have been converted into 16α,17α-(1'-phenylmethylene)-6α-methyl progesterone and 16α17α-(1'-phenylmethylene)-6α-chloro-progesterone respectively.

EXAMPLE XXVI

A neutral solution of ethyl-N-nitroso-N-isopropyl carbamate (at −10° C.) in ether (150 ml.) freshly prepared by treatment of ethyl-N-isopropyl carbamate (15 g.) with nitrogen dioxide, was quickly added to a solution of pregna-5,16-dien-3β-ol-20-one acetate (10 g.) in methanol (150 ml.) and ether (200 ml.) at −40° C. and a methanolic solution of potassium hydroxide (20 ml., 20%) was slowly added, whilst the temperature of the solution was brought up to −5° C. The solution was left at −5° for 1 hour and then at room temperature for 6 hours after which it was washed with water to neutrality and the ether removed by evaporation. The residual solution on standing deposited pregna-5,16-diene-3β-ol-20-one acetate (7 g.) and after concentration the mother liquors gave an oil (3 g.). The oil was acetylated in pyridine/acetic anhydride and the oily product was chromatographed on neutral alumina.

The fraction eluted with benzene/petrol (40–60) 1:3 gave more unchanged pregna-5,16-dien-3β-ol-20-one acetate (0.9 g.).

Elution with benzene/petrol (40–60) 2:3 gave a fraction (1.9 g.) which was crystallised from ethyl acetate to give 16α,17α-[3',1' - (3',3' - dimethyl - 1' - pyrazoline)]-pregn-5-en-3β-ol-20-one acetate.

A solution of 16α,17α-[3',1'-(3',3'-dimethyl-1'-pyrazolino)]-pregna-5-en-3β-ol-20-one acetate (500 mg.) in freshly distilled dioxan (50 ml.), was irradiated for 1 hour in a quartz flask using a medium pressure mercury lamp, placed 6 cm. from the flask. The solution was then evaporated under reduced pressure to give a solid which was crystallised from ethyl acetate to give 16α,17α-(1',1'-dimethylmethylene)-pregn-5-en-3β-ol-20-one acetate (350 mg.).

A solution of 16α,17α-(1',1'-dimethylmethylene)-pregn-5-en-3β-ol-20-one acetate (500 mg.) in methanol was treated with a methanolic solution of sodium hydroxide. The solution was left to stand overnight and then water was added to give a white solid which was crystallised from ethyl acetate to give 16α,17α-(1',1'-dimethylmethylene)-pregn-5-en-3β-ol-20-one (350 mg.).

EXAMPLE XXVII

A neutral solution (at −10° C.) of ethyl-N-nitroso-N-isopropyl carbamate in ether (50 ml.) freshly prepared by treating ethyl-N-isopropyl carbamate (10 g.) with nitrogen dioxide was quickly added to a solution of pregna-4,16-diene-3,20-dione (5 g.) in methanol (100 ml.) and ether (150 ml.) at −40° C. This solution was then treated with a methanolic solution of potassium hydroxide (20 ml.; 20%) over half an hour and the solution was gradually warmed to 0°, kept at 0° for 1 hour, and then left at room temperature overnight. The solution was then washed and evaporated to give an oil which was chromatographed on neutral alumina. The fraction eluted with benzene/petrol (40/60) 3:1 gave unchanged pregna-4,16-diene-3,20-dione (920 mg.) and elution with benzene gave a solid which was crystallised from ethyl acetate to give 16α,17α-[3',1'-(3',3'-dimethyl-1'-pyrazolino)]-pregna - 4-ene-3,20-dione (350 mg.).

A solution of 16α,17α-[3',3'-dimethyl-1'-pyrazolino)]-pregn-4-ene-3,20-dione (200 mg.) in freshly distilled dioxan (50 ml.) was irradiated in a quartz flask for 45 min. using a medium pressure mercury lamp placed 6 cm. from the flask. The solution was then evaporated under reduced pressure to an oil which was crystallised from ethyl acetate to give 16α,17α-(1',1'-dimethylmethylene)-pregn-4-ene-3,20-dione (40 mg.).

EXAMPLE XXVIII

A neutral solution (at −10° C.) of ethyl-N-nitroso-N-cyclopropyl carbamate in ether, freshly prepared by treating ethyl-N-cyclopropyl carbamate with nitrogen dioxide, was quickly added to a solution of pregna-5,16-dien-3β-ol-20-one acetate (4 g.) in methanol (100 ml.) and ether (100 ml.) at −40°, and a methanolic solution of potassium hydroxide (10 ml.; 20%) was slowly added whilst the temperature of the solution was brought up to −5°. The solution was left at −5° for 1 hour and then at room temperature for 6 hours. It was then washed neutral with water, and concentrated to give 16α,17α-[3',1'-(3'-spirocyclopropyl-1'-pyrazolino)] - pregn - 5 - en - 3β - 20 - one pregn-5-en-3β-ol-20-one acetate (1.5 g.) was heated under acetate (3.0 g.).

16α,17α - [3',1' - (3'-spirocyclopropyl-1'-pyrazolino)]-nitrogen at 250° C. for 5 minutes and the oily residue was chromatographed on a column of neutral alumina. The fraction eluted with 3:1 benzene/petrol (40/60) gave 16α,17α - (1'-spirocyclopropyl-methylene) - pregn - 5 - en-3β-ol-20-one acetate (1 g.).

A solution of 16α,17α-[3',1'-spirocyclopropyl-1'-pyrazolino)]-pregn-5-en-3β-ol-20-one acetate (100 mg.) in acetone (25 ml.) was treated with borontrifluoride etherate (1 ml.). The solution was stirred for 1 hour at room temperature in the presence of glass halices. Water was then added, the solid formed was collected, dissolved in benzene and chromatographed on neutral alumina. Elution with benzene gave 16α,17α-(1'-spirocyclopropyl-methylene)-pregn-5-en-3β-ol-20-one acetate identical by comparison of its I.R. spectrum and G.L.C. retention time with a sample prepared as above.

EXAMPLE XXIX

A solution of ethyl-N-nitroso-N-cyclopropyl carbamate at −10° C. prepared in the usual way was added to a solution of pregn-4,16-diene-3,20-dione (5 g.) in ether (200 ml.) and methanol (100 ml.) at −40° C., and a methanolic of potassium hydroxide (10 ml.; 20%) was slowly added whilst the temperature of the solution was brought up to −5° C. The mixture was kept at −5° C. for 1 hour and then left at room temperature for 6 hours, after which it was washed neutral with water, dried and evaporated to dryness to give an oil which was chromatographed on a column of neutral alumina. The fraction (1.5 g.) eluted with benzene containing 5% of ether was crystallised from ethyl acetate to give 16α,17α-[3′,1′-(3′-spirocyclopropyl - 1 - pyrazolino)]-pregn-4-ene-3,20-dione.

16α,17α-[3′,1′ - (3′-spirocyclopropyl-1′-pyrazolino)]-pregn-4-ene-3,20-dione (1.5 g.) was heated at 240° for 5 minutes in a stream of nitrogen. The resulting oil was cooled and chromatographed on neutralised alumina.

The fraction (1 g.) eluted with benzene was crystallised from methanol to give 16α,17α-(1′-spirocyclopropyl-methylene)-pregn-4-ene-3,20-dione.

What is claimed is:
1. A steroid compound of the formula:

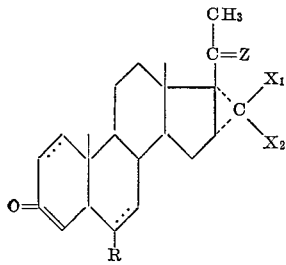

wherein R is selected from the group consisting of hydrogen, methyl and chloro; $X_1$ is selected from the group consisting of hydrogen and a hydrocarbon group; $X_2$ is a hydrocarbon group; $X_1$ and $X_2$ form together with the methylene carbon atom a cycloaliphatic group; Z is selected from the group consisting of O, H(OH) and H(OAcyl); and the bonds between the carbon atoms $C_1$–$C_2$ and $C_6$–$C_7$ are selected from saturated and unsaturated bonds.

2. A steroid compound of the formula:

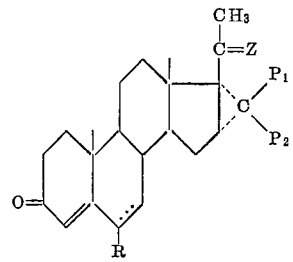

wherein R is selected from the group consisting of hydrogen, methyl and chloro; Z is selected from the group consisting of O, H(OH) and H(OAcyl); $P_1$ is hydrogen; $P_2$ is selected from the group consisting of lower alkenyl and lower alkynyl; and the bond between $C_6$ and $C_7$ is selected from a saturated and an unsaturated bond.

References Cited
UNITED STATES PATENTS 3,345,387  10/1967  Taub et al. _____ 260—397.45

ELBERT L. ROBERTS, Primary Examiner

U.S. Cl. X.R.

260—239.5, 397.4

PO-1050
(5/69)

UNITED STATES PATENT OFFICE
CERTIFICATE OF CORRECTION

Patent No. 3,528,999   Dated September 15, 1970

Inventor(s) PETER BLADON

It is certified that error appears in the above-identified patent and that said Letters Patent are hereby corrected as shown below:

Claim 1, change the structural formula to read:

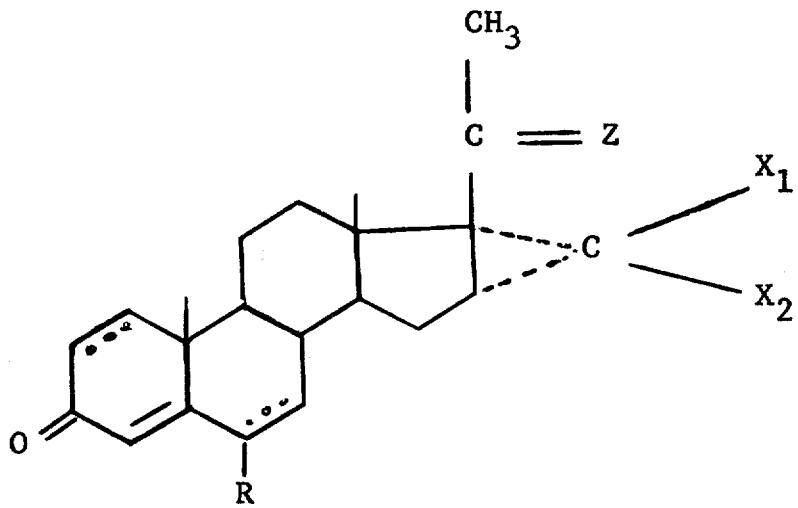

SIGNED AND
SEALED
NOV 17 1970

(SEAL)
Attest:

Edward M. Fletcher, Jr.
Attesting Officer

WILLIAM E. SCHUYLER, JR.
Commissioner of Patents